United States Patent
Goss et al.

(10) Patent No.: US 9,021,794 B2
(45) Date of Patent: May 5, 2015

(54) DECOMPOSITION CHAMBER

(71) Applicant: Cummins Intellectual Property, Inc., Columbus, IN (US)

(72) Inventors: James Goss, Greenwood, IN (US); Duncan Engeham, Darlington (GB); Ryan M. Johnson, Cottage Grove, WI (US)

(73) Assignee: Cummins Intellectual Property, Inc., Columbus, IN (US)

( * ) Notice: Subject to any disclaimer, the term of this patent is extended or adjusted under 35 U.S.C. 154(b) by 84 days.

(21) Appl. No.: 13/837,446

(22) Filed: Mar. 15, 2013

(65) Prior Publication Data

US 2014/0260209 A1    Sep. 18, 2014

(51) Int. Cl.
*F01N 3/02* (2006.01)
*F01N 3/00* (2006.01)
*F01N 3/10* (2006.01)
*F01N 1/00* (2006.01)
*F01N 3/28* (2006.01)
*F01N 13/00* (2010.01)
*F01N 3/20* (2006.01)

(52) U.S. Cl.
CPC .......... *F01N 3/2803* (2013.01); *F01N 13/0097* (2014.06); *F01N 3/2066* (2013.01); *F01N 2240/20* (2013.01); *F01N 3/2839* (2013.01); *F01N 3/2892* (2013.01)

(58) Field of Classification Search
CPC ..... F01N 3/021; F01N 3/2066; F01N 3/2073; F01N 13/0097; F01N 2240/20; F01N 2250/02; F01N 2610/02; B01F 5/04; B01F 2005/0022; B01F 2005/0625
USPC ............ 60/295, 297, 301, 303, 311, 317, 324
See application file for complete search history.

(56) References Cited

U.S. PATENT DOCUMENTS

| | | | |
|---|---|---|---|
| 2009/0229254 A1* | 9/2009 | Gibson | 60/282 |
| 2011/0099978 A1* | 5/2011 | Davidson et al. | 60/274 |
| 2011/0146237 A1* | 6/2011 | Adelmann et al. | 60/274 |
| 2012/0216513 A1* | 8/2012 | Greber et al. | 60/295 |

FOREIGN PATENT DOCUMENTS

WO    WO 2010146285 A1 *  12/2010    ............... F01N 3/28

* cited by examiner

*Primary Examiner* — Audrey K Bradley
(74) *Attorney, Agent, or Firm* — Foley & Lardner LLP

(57) ABSTRACT

According to one embodiment, described herein is an apparatus for decomposing diesel exhaust fluid into ammonia for an internal combustion engine (ICE) system having a selective catalytic reduction system. The apparatus includes an outlet cover, an inlet cover coupled to the outlet cover, and a support plate disposed between the outlet cover and the inlet cover. The support plate forms an outlet channel with the outlet cover and an inlet channel with the inlet cover. The inlet channel is fluidly coupled to the outlet channel. Additionally, the inlet channel may be adjacent to the outlet channel.

24 Claims, 6 Drawing Sheets

DECOMPOSITION CHAMBER

FIELD

The present application relates generally to exhaust aftertreatment systems for internal combustion engines, and more particularly to selective catalytic reduction (SCR) systems of an exhaust aftertreatment system.

BACKGROUND

Exhaust aftertreatment systems receive and treat exhaust gas generated by an internal combustion engine. Typical exhaust aftertreatment systems include any of various components configured to reduce the level of harmful exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

The SCR catalyst is configured to reduce $NO_x$ into less harmful emissions, such as $N_2$ and $H_2O$, in the presence of ammonia ($NH_3$). Because ammonia is not a natural byproduct of the combustion process, it must be artificially introduced into the exhaust gas prior to the exhaust gas entering the SCR catalyst using a diesel exhaust fluid (DEF) which decomposes into ammonia.

Some prior art exhaust aftertreatment systems, however, do not provide adequate decomposition and mixing of injected DEF. Often, conventional systems cause exhaust gas recirculation within the DEF decomposition tube or low temperature regions within the decomposition tube. Exhaust gas recirculation and low temperature regions may result in inadequate mixing or decomposition, which may lead to the formation of solid DEF deposits on the inner walls of the decomposition tube and DEF injector. Solid DEF deposits include the solid byproducts from incomplete decomposition of urea, such as biuret, cyanuric acid, ammelide, and ammeline. Additionally, inadequate mixing and decomposition may result in a low ammonia vapor uniformity index, which can lead to uneven distribution of the ammonia across the SCR catalyst surface, lower $NO_x$ conversion efficiency, and other shortcomings.

SUMMARY

The subject matter of the present application has been developed in response to the present state of the art, and in particular, in response to the problems and needs in the art that have not yet been fully solved by currently available exhaust aftertreatment systems employing an SCR system. Accordingly, the subject matter of the present application has been developed to provide various embodiments of an apparatus, a system, and a method for mitigating adverse conditions induced by DEF deposit formation that overcomes at least some of the above or other shortcomings of the prior art.

According to one embodiment, a diesel exhaust fluid decomposition assembly includes an outlet cover, an inlet cover coupled to the outlet cover, and a support plate disposed between the outlet cover and the inlet cover. The support plate forms an outlet channel with the outlet cover and an inlet channel with the inlet cover. The inlet channel is fluidly coupled to the outlet channel, and the inlet channel is adjacent to the outlet channel. A diesel exhaust fluid injector may be coupled with the inlet cover to inject a diesel exhaust fluid into the inlet channel In certain implementations, the inlet channel has a converging cross-sectional profile, such that a fluid accelerates as a result of passing through the inlet channel. The outlet channel can have a converging cross-sectional profile, such that a fluid accelerates as a result of passing through the outlet channel. At least one of a first end of the inlet cover or a first end of the outlet cover can form a fluid director for changing the direction of fluid flow of a fluid between the inlet channel and the outlet channel. Each of the inlet channel and the outlet channel can include a non-circular cross-sectional profile According to some implementations, the support plate is formed of at least two coupled non-planar sections with each of the at least two non-planar sections having a first surface that forms part of the inlet channel and an opposing second surface that forms part of the outlet channel. The at least two coupled non-planar sections can be positioned to form a first region in the outlet channel that includes a converging cross-sectional profile, and a second region in the outlet channel that includes a diverging cross-sectional profile.

In some implementations, the outlet cover further includes a plurality of openings formed in a grid pattern. Each of the plurality of openings can have a diameter in the range of between about 0.2 and 0.3 inches, and the grid pattern can have a pitch in the range of between about 0.5 and 0.75.

According to certain implementations, the inlet cover further includes an inlet opening fluidly coupled with a chamber formed by an external cover and the inlet cover. The chamber fluidly couples the inlet opening with a diesel particulate filter. The external cover can be configured to envelope the internal cover and to direct a fluid around at least a portion of an outer surface of the inlet cover. At least a portion of the inlet cover can be maintained at a temperature substantially equivalent to a temperature of fluid within the chamber.

In some implementations, the inlet cover further includes a plurality of openings forming a grid pattern in the inlet cover. Each of the plurality of openings has substantially the same cross-sectional area. The inlet cover further includes a non-circular opening having a cross-sectional area greater than one of the plurality of openings. The outlet cover can further include a plurality of openings forming a grid pattern extending from a first end of the outlet cover to a second end of the outlet cover. A cross-sectional area of each of the plurality of openings can be selected according to a proximity in the grid pattern to the first end.

In another embodiment, an exhaust aftertreatment system includes a housing that has an exhaust inlet and an exhaust outlet. The housing is configured to enclose a diesel particulate filter (DPF) and at least one selective catalytic reduction (SCR) catalyst, and to direct a flow of exhaust gas through the DPF and the SCR. The DPF is fluidly coupled with the exhaust inlet and configured to direct the flow of exhaust gas in a first direction, The system also includes a diesel exhaust fluid (DEF) decomposition chamber that is removably attached to the housing and in fluid communication with the DPF. The decomposition chamber is disposed between the DPF and the SCR. The decomposition chamber includes an inlet cover coupled to an outlet cover and a support plate disposed between the outlet cover and the inlet cover. The support plate forms an outlet channel with the outlet cover and an inlet channel with the inlet cover. The inlet channel is fluidly coupled to the outlet channel, and the inlet channel is adjacent to the outlet channel.

According to some implementations of the system, the inlet channel has a converging cross-sectional profile, such that a fluid accelerates as a result of passing through the inlet channel. The outlet channel can have a converging cross-sectional profile, such that a fluid accelerates as a result of passing through the outlet channel. The support plate can be formed of at least two coupled non-planar sections with each of the at least two non-planar sections having a first surface that forms part of the inlet channel and an opposing second surface that forms part of the outlet channel. The system can include a plurality of SCR catalysts each having an inlet surface, where the DEF decomposition chamber is configured to provide a substantially uniform distribution of DEF and exhaust gas at the inlet surfaces of the plurality of SCR catalysts.

In yet another embodiment, a diesel exhaust fluid decomposition assembly includes an outlet cover, an inlet cover coupled to the outlet cover, and a support plate disposed between the outlet cover and the inlet cover. The support plate forms an outlet channel with the outlet cover for directing an exhaust gas flow in a first direction, and an inlet channel with the inlet cover for directing the exhaust gas flow in a second direction that is parallel but opposite to the first direction.

Reference throughout this specification to features, advantages, or similar language does not imply that all of the features and advantages that may be realized with the subject matter of the present disclosure should be or are in any single embodiment or implementation of the subject matter. Rather, language referring to the features and advantages is understood to mean that a specific feature, advantage, or characteristic described in connection with an embodiment is included in at least one embodiment. Discussion of the features and advantages, and similar language, throughout this specification may, but do not necessarily, refer to the same embodiment or implementation.

The described features, advantages, and characteristics of the subject matter of the present disclosure may be combined in any suitable manner in one or more embodiments and/or implementations. One skilled in the relevant art will recognize that the subject matter of the present disclosure may be practiced without one or more of the specific features or advantages of a particular embodiment or implementation. In other instances, additional features and advantages may be recognized in certain embodiments and/or implementations that may not be present in all embodiments or implementations of the subject matter of the present disclosure. These features and advantages of the present subject matter will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

The described features, structures, or characteristics of the subject matter of the present disclosure may be combined in any suitable manner in one or more embodiments. In the following description, numerous specific details are provided to impart a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the subject matter.

Figure 1:
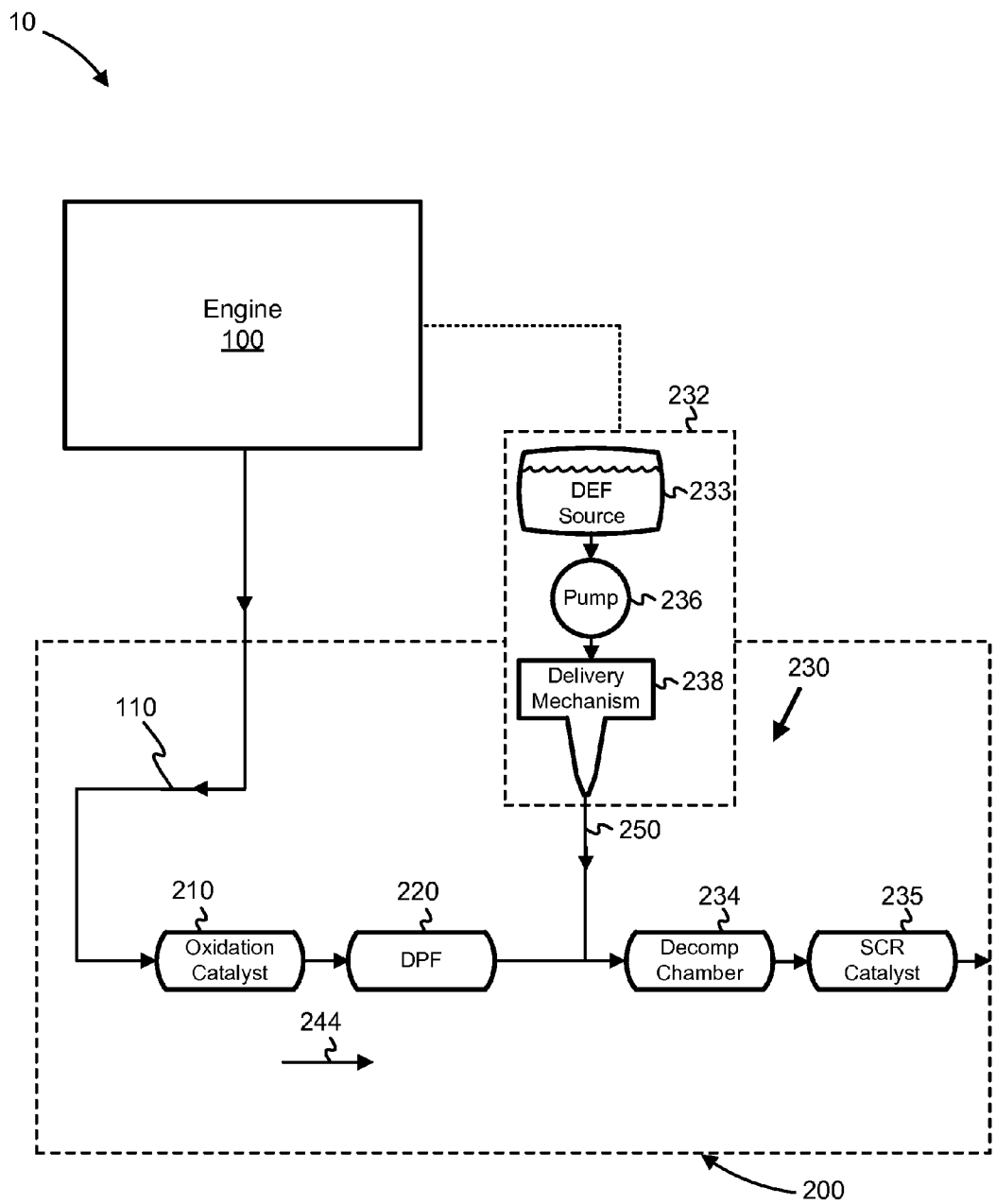
FIG. 1 illustrates one embodiment of an internal combustion engine system in accordance with embodiments of the present disclosure.

FIG. 1 illustrates one embodiment of an internal combustion engine system 10 in accordance with embodiments of the present disclosure. The system 10 includes an internal combustion engine 100 and an exhaust gas aftertreatment system 200 coupled to the exhaust output 110 of the engine. The internal combustion engine 100 can be a compression ignited internal combustion engine, such as a diesel fueled engine, or a spark-ignited internal combustion engine, such as a gasoline fueled engine operated lean. Although not shown, the engine 100 can include any of various sensors, such as temperature sensors, pressure sensors, and mass flow sensors.

The exhaust gas aftertreatment system 200 is coupled to an outlet pipe of an exhaust manifold. Exhaust gas passing through the outlet pipe is represented by exhaust output 110. At least a portion of the exhaust output 110 passes through the exhaust aftertreatment system 200. Generally, the exhaust aftertreatment system 200 is configured to remove various chemical compound and particulate emissions present in the exhaust output 110 received from the outlet pipe. After being treated by the exhaust aftertreatment system 200, the exhaust gas is expelled into the atmosphere via a tailpipe (not shown). In certain implementations, the exhaust aftertreatment system 200 is secured to a vehicle in which the engine is housed.

In the illustrated embodiment, the exhaust aftertreatment system 200 includes an oxidation catalyst 210, a particulate matter filter or diesel particulate filter (DPF) 220, a selective catalyst reduction (SCR) system 230 having a diesel exhaust fluid (DEF) delivery system 232, a DEF decomposition chamber 234, and an SCR catalyst 235. In an exhaust flow direction, indicated by directional arrow 244, the exhaust output 110 flows through the oxidation catalyst 210, through the DPF 220, through the decomposition chamber 234, through the SCR catalyst 235, and is then expelled into the atmosphere via the tailpipe. In other words, the DPF 220 is positioned downstream of the oxidation catalyst 210, and the SCR catalyst 235 is positioned downstream of the DPF 220.

The oxidation catalyst 210, the DPF 220, decomposition chamber 234, and the SCR catalyst 235 can be coupled together by an exhaust tube or pipe. Generally, exhaust gas treated in the exhaust gas aftertreatment system 200 and released into the atmosphere consequently contains significantly fewer pollutants, such as diesel particulate matter, $NO_x$, and hydrocarbons, such as carbon monoxide and carbon dioxide, than untreated exhaust gas.

The oxidation catalyst 210 can be any of various flow-through, diesel oxidation catalysts (DOC) known in the art. Generally, the oxidation catalyst 210 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 210 may sufficiently reduce the hydrocarbon and CO concentrations in the exhaust to meet the requisite emissions standards.

The DPF 220 can be any of various particulate filters known in the art configured to reduce particulate matter concentrations, e.g., soot and ash, in the exhaust gas to meet requisite emission standards. The DPF 220 can be electrically coupled to a controller, that controls various characteristics of the DPF 220, such as, for example, the timing and duration of filter regeneration events.

The SCR system 230 includes a DEF delivery system 232 that includes a DEF source 233, pump 236, and DEF delivery mechanism 238 (e.g., an injector). The DEF source 233 can be a container or tank capable of retaining DEF, such as, for example, ammonia ($NH_3$) or urea. The DEF source 233 is in DEF supplying communication with the pump 236, which is configured to pump DEF from the DEF source to the DEF delivery mechanism 238. The DEF delivery mechanism 238 is coupled to the exhaust tube at a location upstream of the decomposition chamber 234 and downstream of the DPF 220. The delivery mechanism 238 includes an injector that is selectively controllable to inject DEF 250 directly into the exhaust gas stream through an injector introduction opening or tube in the DEF decomposition chamber 234.

In some embodiments, the diesel exhaust fluid is urea, which decomposes as it travels through the decomposition chamber 234 to produce ammonia. The ammonia reacts with $NO_x$ in the presence of the SCR catalyst 235 to reduce the $NO_x$ to less harmful emissions, such as $N_2$ and $H_2O$. The capability of the SCR catalyst 235 to reduce $NO_x$ to less harmful emissions is largely dependent upon the capability of the diesel exhaust fluid to decompose to ammonia.

Typically, ammonia is not directly injected into the exhaust gas due to safety considerations associated with the storage of gaseous ammonia. Accordingly, the exhaust aftertreatment system 200 is designed to inject the diesel exhaust fluid, or reductant, into the exhaust gas, which is capable of decomposing into gaseous ammonia in the presence of exhaust gas under certain conditions. The DEF commonly used by conventional exhaust aftertreatment systems is a urea-water solution.

The decomposition of DEF into gaseous ammonia occurs, generally, in three stages. First, DEF mixes with exhaust gas and water is removed from the DEF through a vaporization process. Second, the temperature of the exhaust causes a thermolysis-induced phase change in the DEF and decomposition of the DEF into isocyanic acid (HNCO) and $NH_3$. Third, the isocyanic acid reacts with water in a hydrolysis process under specific pressure and temperature concentrations to decompose into ammonia and carbon dioxide ($CO_2$). The gaseous ammonia is then introduced at the inlet face of the SCR catalyst 235, flows through the catalyst, and is consumed in the $NO_x$ reduction process. Any unconsumed ammonia exiting the SCR system can be reduced to $N_2$ and other less harmful or less noxious components using an ammonia oxidation catalyst.

The delivery mechanism 238 injects DEF into the decomposition chamber 234. Upon injection into the exhaust gas stream, the injected DEF spray is heated by the exhaust gas stream to trigger the decomposition of DEF into ammonia. As the DEF and exhaust gas mixture flows through the decomposition chamber, the DEF further mixes with the exhaust gas before entering an the SCR catalyst 235. The configuration of the decomposition chamber, 234, as will be described below, enables the DEF to sufficiently decompose and mix with the exhaust gas prior to entering the SCR catalysts 235 to provide an adequately uniform distribution of ammonia at the inlet face of the SCR catalysts 235.

Figure 2:
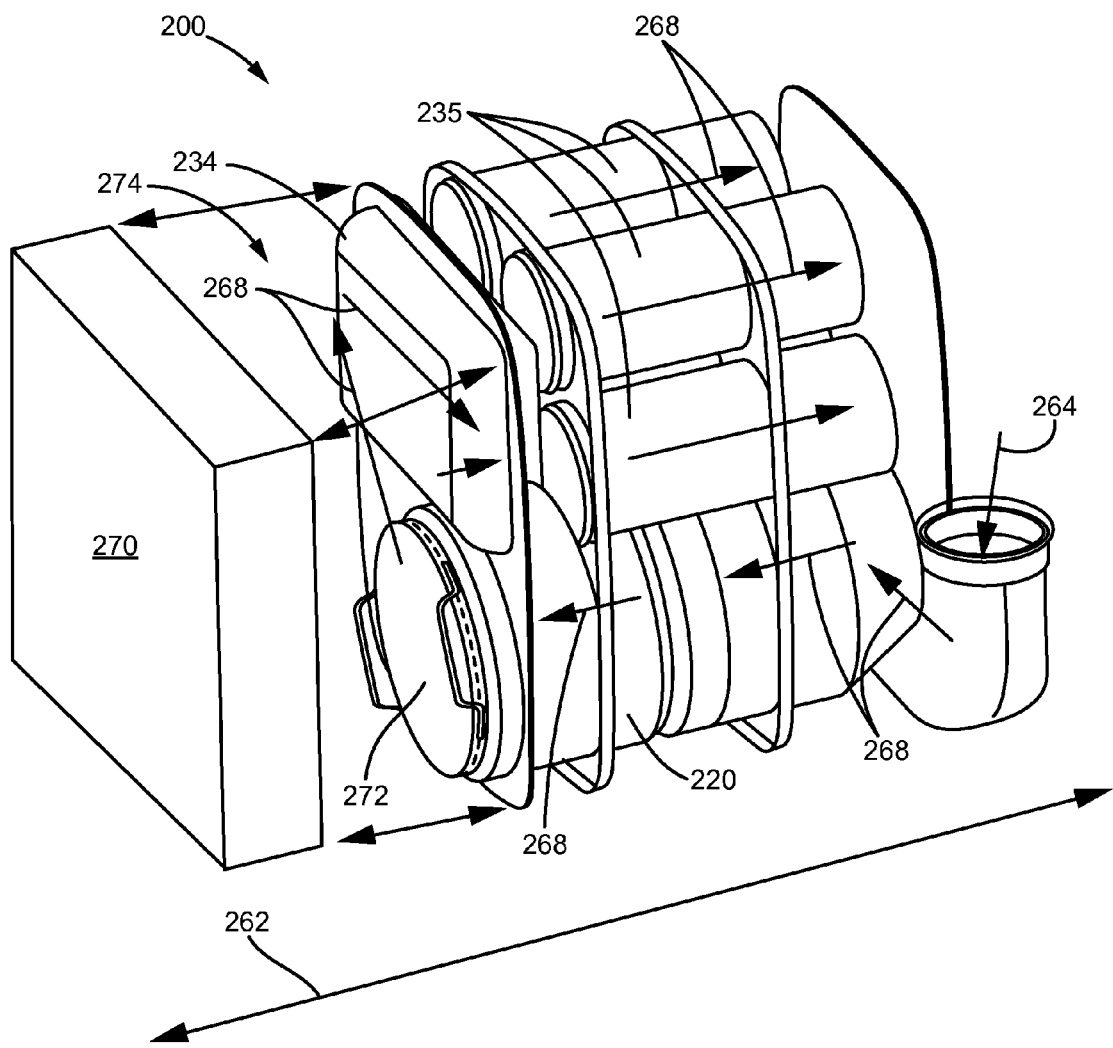
FIG. 2 illustrates one embodiment of the system for the treatment of exhaust gases.

FIG. 2 illustrates one embodiment of the system 200 for the treatment of exhaust gases. The system 200 is configured to minimize longitudinal space that is occupied in a vehicle. The longitudinal axis, with respect to FIG. 2, is illustrated by directional arrow 262. The system 200 minimizes longitudinal space usage in a vehicle by layering the SCR catalyst 235 on top of the DPF 220. Exhaust gas enters the DPF 220 and travels in a direction indicated by the directional arrows 268. By directing the gas in a first longitudinal direction through the DPF 220 and subsequently in a second, parallel but opposite longitudinal direction through the SCR catalyst 235 the system 200 maintains a longitudinal distance sufficient to process the exhaust gas while reducing the overall longitudinal space occupied by the system 200.

A cover 270 attaches to the system 200 and encloses an outlet opening 272 of the DPF 220 and an inlet opening 274 of the decomposition chamber 234. The cover 270 forms a chamber that fluidly couples the DPF 220 and the decomposition chamber 234. In other words, exhaust gas passing through the DPF 220 passes through the chamber created by the cover 270 to the inlet opening 274 of the decomposition chamber 234. A housing (not shown) directs the exhaust gas from the decomposition chamber 234 into at least one SCR catalyst 235. In the depicted embodiment, the system 200 includes multiple SCR catalysts 235. The SCR catalysts 235, in one embodiment, have dimensions similar to a traditional passenger vehicle SCR. For example, each SCR catalyst 235 may have a diameter in the range of between 5 and 6 inches, and a length in the range of between about 9 and 12 inches.

In one embodiment, the sum of the cross-sectional areas of the SCR catalysts 235 is substantially equivalent to the cross-sectional area of the DPF 220. In another embodiment, a sum of volumetric flow rates of the SCR catalysts 235 is substantially equivalent to a volumetric flow rate of the DPF 220. Stated differently, the system 200 includes a quantity of SCR catalysts 235 that are capable of maintaining an exhaust flow rate and pressure equivalent to the DPF 220. In certain embodiments, this is accomplished with a single SCR catalyst 235 having a diameter sufficient to maintain the exhaust flow rate described. In another embodiment, the exhaust flow rate and pressure are maintained with an array of SCR catalysts 235 that together are capable of maintaining the exhaust gas flow rate and pressure of the DPF 220.

The decomposition chamber 234 is formed having an inlet channel fluidly coupled with the inlet opening 274, and an outlet channel fluidly coupled with the inlet channel. The inlet channel and the outlet channel will be described in greater detail below with reference to FIGS. 4-6.

Figure 3:
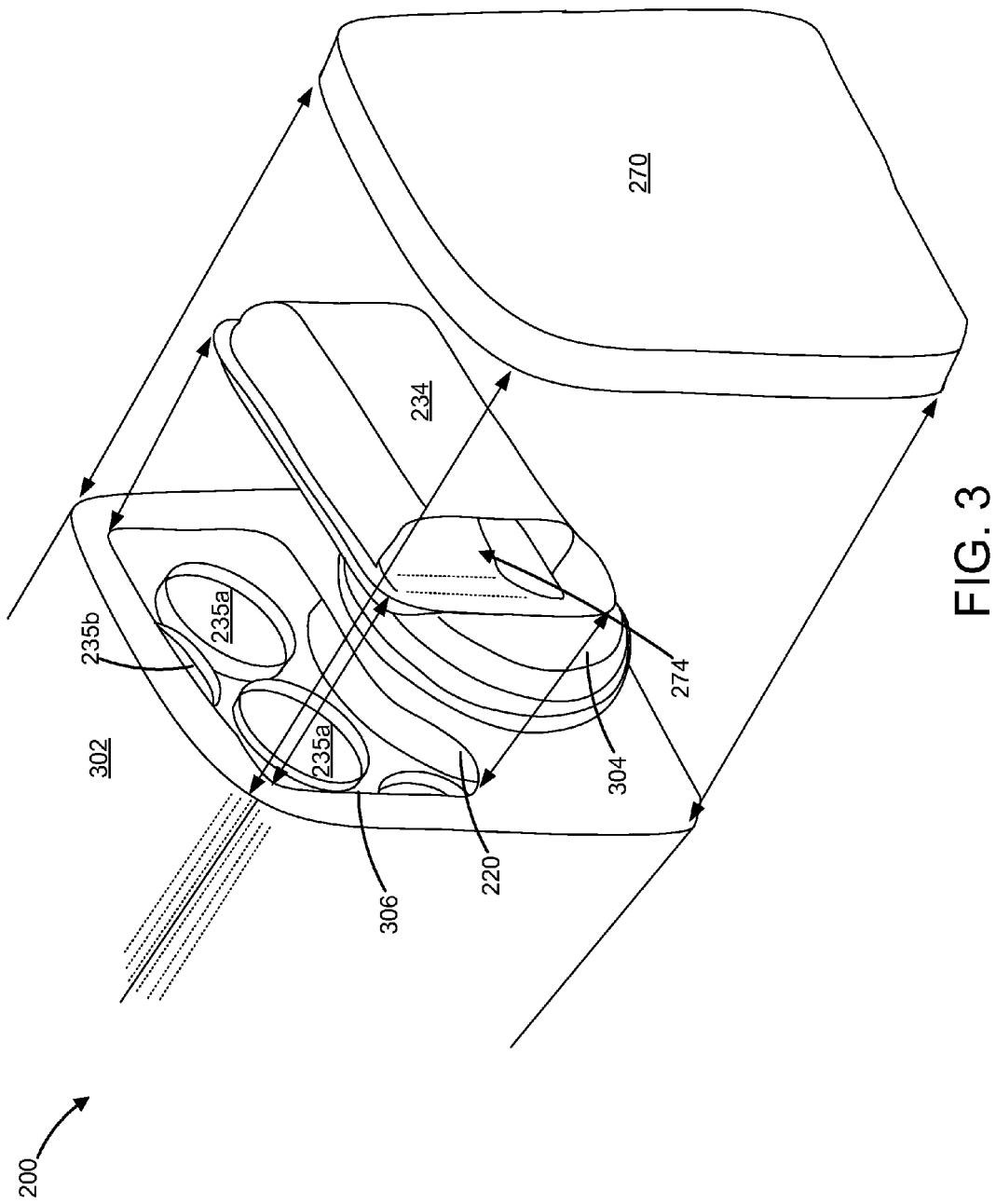
FIG. 3 illustrates another embodiment of the system in accordance with embodiments of the present disclosure.

FIG. 3 illustrates another embodiment of the system 200 in accordance with embodiments of the present disclosure. The system 200, as described above, includes a housing 302 that encloses the DPF and the SCR catalysts 235. The DPF 220, as depicted, is formed with an outlet 304 that passes through the housing 302. The cover 270 removably couples to the housing 302 and creates a seal that prevents exhaust gasses from escaping. Exhaust gasses travel in a chamber formed by the cover from the outlet 304 of the DPF to the inlet 274 of the decomposition chamber 234. The chamber is formed by inner surfaces of the cover 270 and the housing 302. The exhaust gas passes through the chamber and into the opening 274 of the decomposition chamber 234.

In one embodiment, the decomposition chamber 234 is removably coupled to the housing 302. The decomposition chamber 234 is coupled to the housing 302 using a fastener (not shown). For example, the decomposition chamber 234 may be attached using screws, bolts, etc. In another embodiment, the decomposition chamber 234 is rigidly coupled to the housing 302. For example, the decomposition chamber 234 may be welded to the housing 302. In another embodiment, the decomposition chamber 234 is formed with the housing, as a single unit.

An opening 306 in the housing 302 may have a profile corresponding to an outer profile of the decomposition chamber 234. The opening 306 in the housing 302 is configured to receive an outlet surface of the decomposition chamber, which will be described in greater detail below with reference to FIG. 5. The opening 306 is positioned and configured to allow the exhaust gas to pass from the decomposition chamber 234 to the SCR catalysts 235. The SCR catalysts 235 may have a circular cross-sectional profile, as depicted. The SCR catalysts 235, in one embodiment, are positioned radially, in a first layer (SCR catalyst 235a), above and adjacent to the DPF 220. A second layer of SCR catalysts 235b may be positioned in a closed-pack arrangement above the first layer of SCR catalysts 235. Together, the grouping of SCR catalysts 235a, 235b are configured to maintain the flow rate of the exhaust gas from the DPF 220.

Figure 4:
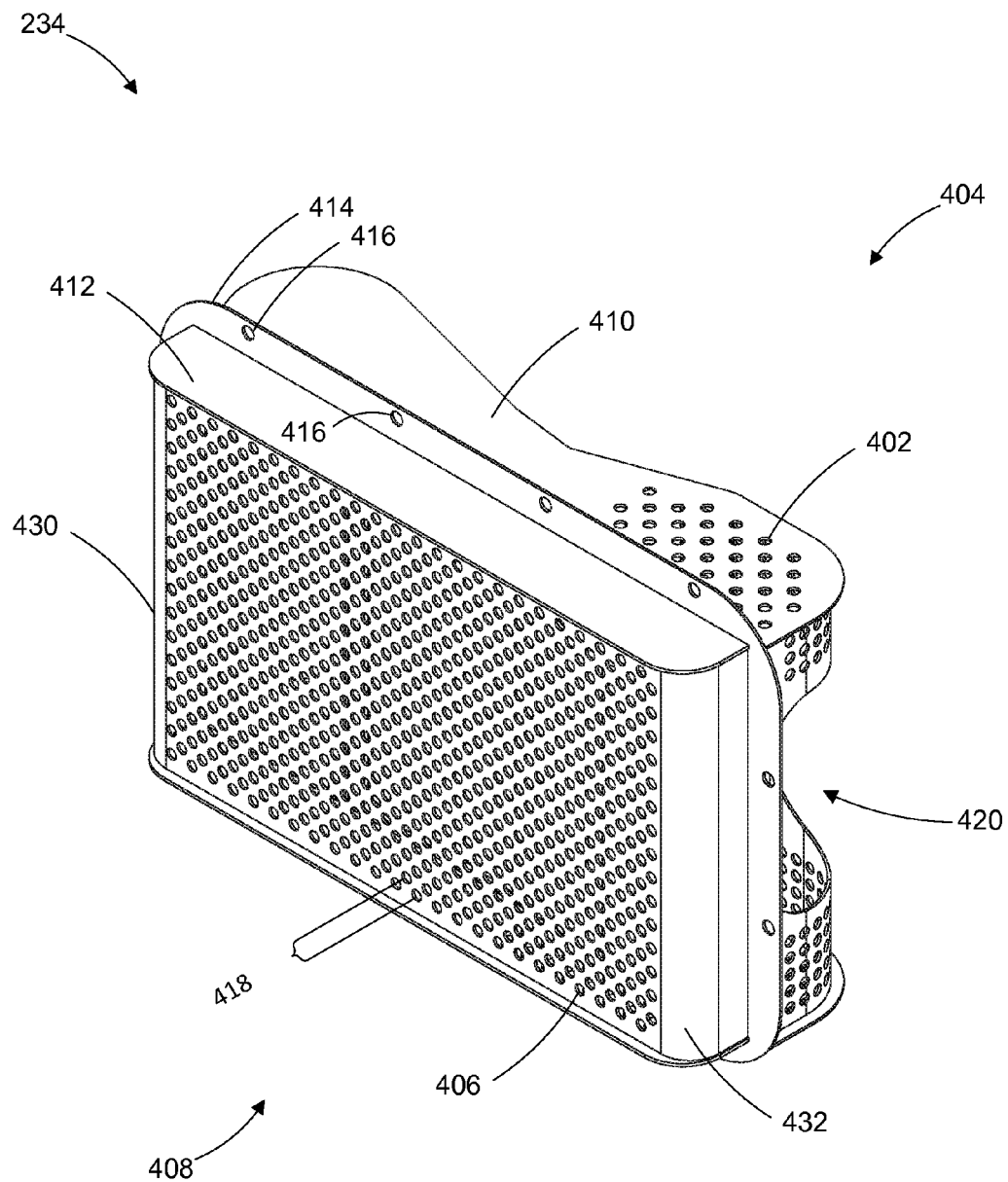
FIG. 4 illustrates one embodiment of the decomposition chamber in accordance with embodiments of the present disclosure.

FIG. 4 illustrates one embodiment of the decomposition chamber 234 in accordance with embodiments of the present disclosure. The decomposition chamber 234, in one embodiment, is a substantially rectangular device having a plurality of openings 402 on an inlet side 404 for receiving exhaust gas, and a plurality of openings 406 on an opposing outlet side 408 for the outlet of the exhaust gas. For clarity and simplicity in FIG. 4, only a representative opening of each of the plurality of openings 402, 406 is enumerated.

The decomposition chamber 234 is formed of an inlet cover 410, an outlet cover 412, and a support plate 414 disposed between the inlet cover 410 and the outlet cover 412. The support plate 414 may include mounting apertures 416 for receiving a fastener and coupling the decomposition chamber 234 to the housing as described above with reference to FIG. 3. The support plate 414, additionally, forms a border between the inlet side 404 and the outlet side 408.

In one embodiment, the plurality of holes 406 of the outlet cover 412 are arranged in a grid pattern. The grid pattern may be as depicted, or alternatively, the grid plurality of openings 406 may be arranged in rows and columns. In another embodiment, the plurality of openings 406 may be arranged in a pattern based on the cross-sectional profile of one of the plurality of openings. In other words, if the cross-sectional profile of the opening 406 is a hexagon, the corresponding grid pattern may resemble a honeycomb pattern. The pitch 418 of the grid pattern, in one embodiment, is in the range of between about 0.5 and 0.75 inches. The term pitch refers to the distance between successive corresponding points in the grid pattern. Stated differently, the term pitch refers to how often the pattern repeats. Each opening in the outlet cover 412 may have a diameter in the range of between about 0.2 and 0.3 inches.

In another embodiment, each opening 406 has a non-circular cross-sectional profile. In this embodiment, each opening 406 of the outlet cover 412 may have a cross-sectional area similar to the cross-sectional area of a circular opening having a diameter in the range of between about 0.2 and 0.3 inches. The openings 406 of the outlet cover 412 may each have a common cross-sectional area. In an alternative embodiment, the cross-sectional area of the openings 406 varies according to the position of the opening in the outlet cover 412. For example, openings 406 closer to a first end 430 of the outlet cover may have a cross-sectional area that is smaller than openings 406 that are closer to a second end 432 of the outlet cover 412, or vice-versa. The configuration (e.g., quantity, size, pattern, etc.) of the openings 406 can be dependent on the configuration (e.g., quantity, size, pattern, etc.) of the SCR catalysts to provide a relatively uniform distribution of DEF and exhaust gas at the inlets of the SCR catalysts.

The inlet cover 410, in one embodiment, is formed with an inlet opening 420. The inlet opening 420 is formed at one end of the inlet cover and allows for the ingress of a DEF spray from a DEF injector. Although not shown, a DEF spray tube may be secured to the inlet cover 410 over the inlet opening 420 to restrict the flow of exhaust gas through the inlet opening 420, but allow the flow of injected DEF through the inlet opening 420 into the inlet channel of the decomposition chamber 234.

In another embodiment, the inlet cover is formed with the inlet opening 420 and a plurality of smaller openings 402 positioned around the inlet opening 420. The smaller openings 402, in one example, are similar in size to the openings 406 of the outlet cover. Exhaust gas enters the inlet channel of the decomposition chamber 234 through the plurality of smaller openings 402.

Figure 5:
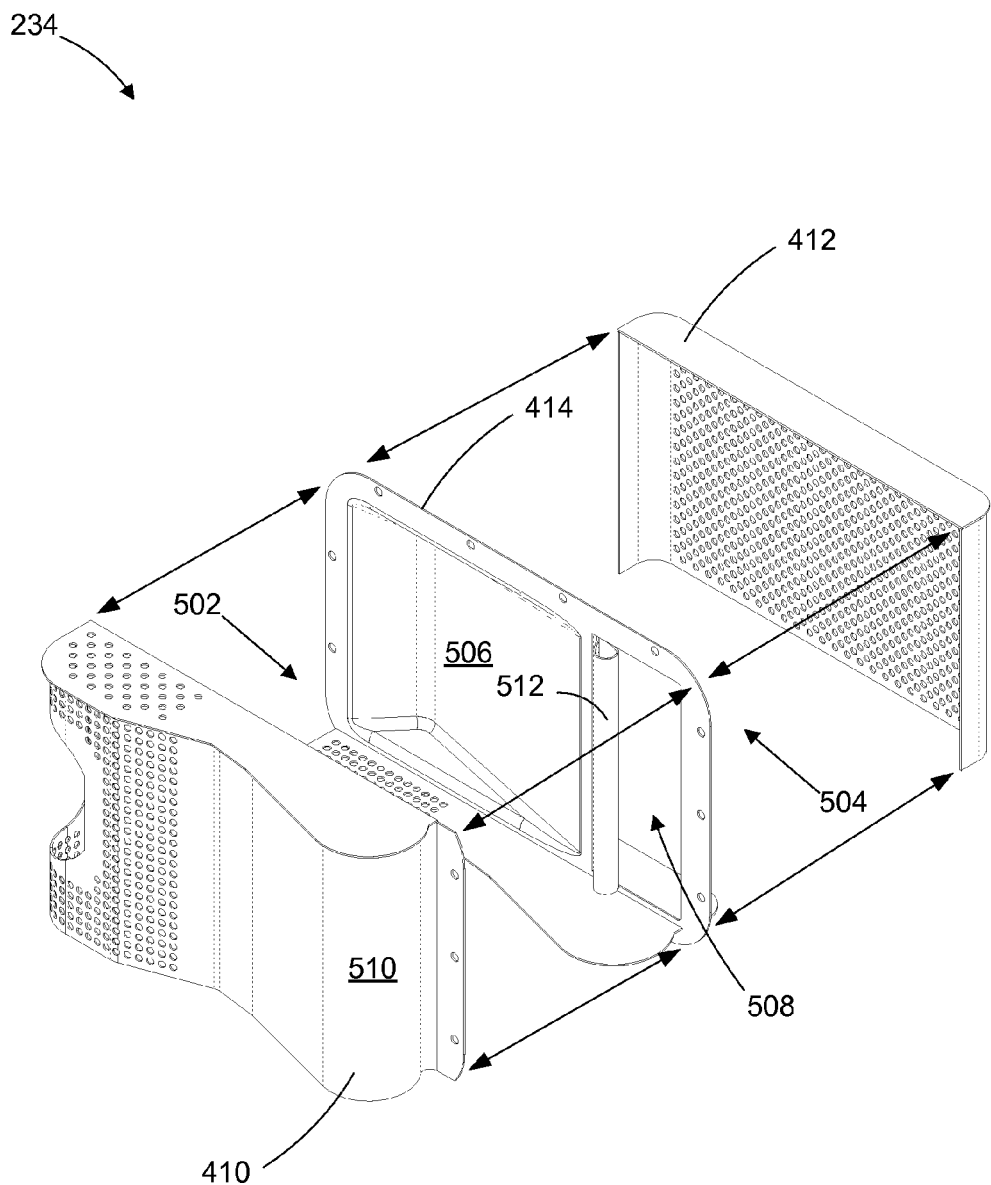
FIG. 5 illustrates another embodiment of the decomposition chamber.

FIG. 5 illustrates another embodiment of the decomposition chamber 234. The decomposition chamber 234, in the depicted embodiment, is formed of three separate parts, the inlet cover 410, the support plate 414, and the outlet cover 412. Each of the inlet cover 410, support plate 414, and the outlet cover 412 may be formed of a stamped metal, such as steel or aluminum. The material selected for the decomposition chamber is selected to be chemically resistant to the toxic environment of the exhaust gas. In a further embodiment, the decomposition chamber 234 is formed of a chemically resistant polymer, or other composite material.

The inlet cover 410 and the outlet cover 412 are attachable to the support plate 414 to form the decomposition chamber 234. In one embodiment, the inlet cover 410 is removable to facilitate repairs and or replacement of the inlet cover 410. Similarly, the outlet cover 412 may be removable. In an alternative embodiment, the inlet cover 410 and the outlet cover 412 are formed as a unitary device with the support plate 414.

The support plate 414 forms an inlet channel 502 with the inlet cover 410 and an outlet channel 504 with the outlet cover 412, both of which will be described in greater detail below with reference to FIG. 6. The support plate 414 is formed with a curved region 506 and an opening 508. The curved region 506 directs exhaust gas flow down the inlet channel 502 towards the opening 508. The opening 508 forms a passageway between the inlet channel 502 and the outlet channel 504. A corresponding curved region 510 may be formed in the inlet cover to urge or direct exhaust gas flow to the outlet channel 504. In an alternative embodiment, one of skill in the art will recognize that a similar curved region may be formed in the outlet cover 412 to direct the exhaust gas flow.

In a further embodiment, the support plate 414 includes an exhaust gas flow deflector 512. The deflector 512, in the depicted embodiment, is formed of a rolled sheet of material to resemble a tear-drop. In alternative embodiments, the deflector 512 may be formed into any shape that directs the exhaust gas flow into the curved region 510 of the inlet cover 410. Together, the deflector 512 and the curved region 510 direct exhaust gas flow from the inlet channel 502, through the opening 508 and into the outlet channel 504.

Figure 6:
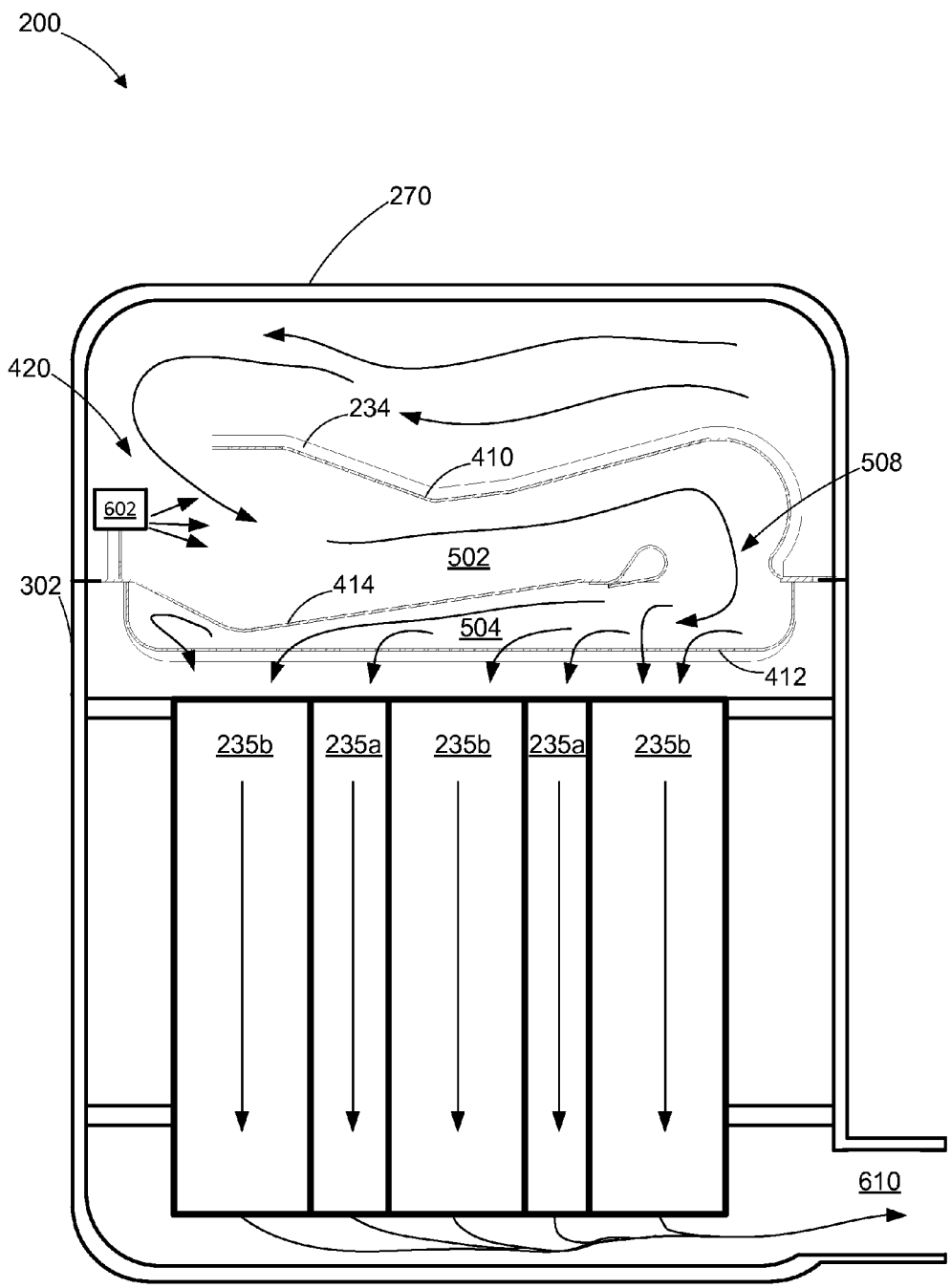
FIG. 6 illustrates a top-down view of a cross-section of the system in accordance with embodiments of the present disclosure.

FIG. 6 illustrates a top-down view of a cross-section of the system 200 in accordance with embodiments of the present disclosure. Commonly, all of the injected diesel exhaust fluid may not completely decompose to ammonia due to localized exhaust gas recirculation, low temperature regions of exhaust gas, poor mixing of diesel exhaust fluid and exhaust gas, or unfavorable injected diesel exhaust fluid droplet sizes. Sometimes, injected diesel exhaust fluid form solid diesel exhaust fluid deposits on the inner walls of an exhaust system. Solid DEF deposits can negatively affect the performance of the engine and the aftertreatment system. Beneficially, the decomposition chamber 234, as will be discussed with reference to FIG. 6, overcomes these shortcomings. Directional arrows are positioned throughout the system 200 to indicate the direction of exhaust gas flow.

As described above, the system 200 includes the cover 270 attached to the housing 302. Disposed within the cover 270, and coupled to the housing 302, is the decomposition chamber 234. Disposed within the housing is the DPF 220 (not visible here) and the SCR catalysts 235a, 235b (where SCR catalysts 235a are positioned adjacent the DPF 220, and SCR catalysts 235b are positioned above catalyst 235a). The SCR catalyst 235 can be any of various catalysts known in the art. For example, in some implementations, the SCR catalyst 235 is a vanadium-based catalyst, and in other implementations, the SCR catalyst is a zeolite-based catalyst, such as a Cu-Zeolite or a Fe-Zeolite catalyst. The SCR catalysts 235a, 235b, in one embodiment, are coaxial and comprise co-planar inlets (see, for example, FIG. 3).

The cover 270 directs exhaust gas flow from the DPF 220 to the decomposition chamber 234. The cover 270 encloses the decomposition chamber 234, and as a result, exhaust gas circulates around the outside of the decomposition chamber 234 before reaching the inlet opening 420. Accordingly, the decomposition chamber 234 is maintained at the same temperature as the exhaust gas, and low temperature regions do not occur. As such, the decomposition chamber 234 beneficially inhibits the formation of solid DEF deposits.

In one embodiment, a DEF injector 602 is coupled to the decomposition chamber 234 near the inlet opening 420. The DEF injector 602, as described above with reference to FIG. 1, injects diesel exhaust fluid (DEF) into the exhaust gas flow. The decomposition chamber 234 provides non-circular inlet and outlet channels 502, 504 for the decomposition of DEF into ammonia. The support plate 414 functions as a diffusion plate to address both high backpressure (by increasing the cross-sectional area of the exhaust gas flow path) and uniform distribution of exhaust gas flow across multiple SCR catalysts 235a, 235b.

The inlet channel 502, in one embodiment, is formed by an inner surface of the inlet cover 410 and a surface of the support plate 414. The inlet channel 502 may be formed with a converging cross-sectional area. Stated differently, the cross-sectional area of the inlet channel 502 is greater near the inlet opening 420 than the cross-sectional area near the passageway 508. The reduction in cross-sectional area causes the exhaust gas flow rate to increase slightly and a localized reduction in exhaust gas pressure, both of which increase the mixture of DEF from the injector 602 with exhaust gas. The volume of the inlet chamber 502 is selected to provide ample residence of DEF under all flow conditions for the system 200.

The outlet chamber 504 is positioned adjacent the inlet chamber 502 and directs the exhaust gas to flow in a generally parallel but opposite direction to the exhaust gas flow direction of the inlet chamber. The outlet chamber 504 is formed from a surface of the support plate 414 and the outlet cover 412. The cross-sectional area of the outlet chamber 504 also converges, as described above with reference to the inlet channel 502. The converging cross-sectional area urges the exhaust gas flow to evenly distribute through the perforated outlet cover 412. Consequently, the exhaust gas flow evenly into the separate SCR catalysts 235a, 235b, and ultimately into a tailpipe 610 of the vehicle.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The subject matter of the present disclosure may be embodied in other specific forms without departing from its spirit or essential characteristics. The described embodiments are to be considered in all respects only as illustrative and not restrictive. The scope of the subject matter is, therefore, indicated by the appended claims rather than by the foregoing description. All changes which come within the meaning and range of equivalency of the claims are to be embraced within their scope.

What is claimed is:

1. A diesel exhaust fluid decomposition assembly comprising:
   an outlet cover;
   an inlet cover coupled to the outlet cover; and
   a support plate disposed between the outlet cover and the inlet cover, the support plate forming an outlet channel with the outlet cover and an inlet channel with the inlet cover, wherein the inlet channel is fluidly coupled to the outlet channel, and wherein the inlet channel is adjacent to the outlet channel,
   wherein the outlet cover further comprises a plurality of openings formed in a grid pattern.

2. A diesel exhaust fluid decomposition assembly comprising:
   an outlet cover;
   an inlet cover coupled to the outlet cover; and
   a support plate disposed between the outlet cover and the inlet cover, the support plate forming an outlet channel with the outlet cover and an inlet channel with the inlet cover, wherein the inlet channel is fluidly coupled to the outlet channel, and wherein the inlet channel is adjacent to the outlet channel, wherein the outlet cover, the inlet cover, and the support plate are axially aligned, and wherein the outlet cover further comprises a plurality of openings formed in a grid pattern.

3. The diesel exhaust fluid decomposition assembly of claim 1, wherein the inlet cover further comprises an inlet opening fluidly coupled with a chamber formed by an external cover and the inlet cover, the chamber fluidly coupling the inlet opening with a diesel particulate filter.

4. The diesel exhaust fluid decomposition assembly of claim 1, wherein each of the inlet channel and the outlet channel comprise a non-circular cross-sectional profile.

5. The diesel exhaust fluid decomposition assembly of claim 1, further comprising a diesel exhaust fluid injector coupled with the inlet cover to inject a diesel exhaust fluid into the inlet channel.

6. The diesel exhaust fluid decomposition assembly of claim 1, wherein the outlet cover further comprises a plurality of openings forming a grid pattern extending from a first end of the outlet cover to a second end of the outlet cover, and wherein a cross-sectional area of each of the plurality of openings is selected according to a proximity in the grid pattern to the first end.

7. The diesel exhaust fluid decomposition assembly of claim 2, wherein the support plate is formed of at least two coupled non-planar sections, each of the at least two non-planar sections having a first surface that forms part of the inlet channel and an opposing second surface that forms part of the outlet channel.

8. The diesel exhaust fluid decomposition assembly of claim 7, wherein the at least two coupled non-planar sections are positioned to form a first region in the outlet channel comprising a converging cross-sectional profile, and a second region in the outlet channel comprising a diverging cross-sectional profile.

9. The diesel exhaust fluid decomposition assembly of claim 1, wherein each of the plurality of openings has a diameter in the range of between 0.2 and 0.3 inches, and wherein the grid pattern has a pitch in the range of between 0.5 and 0.75.

10. The diesel exhaust fluid decomposition assembly of claim 9, wherein the external cover is configured to envelope the inlet cover and to direct a fluid around at least a portion of an outer surface of the inlet cover, such that the at least a portion of the inlet cover is maintained at a temperature equivalent to a temperature of fluid within the chamber.

11. The diesel exhaust fluid decomposition assembly of claim 1, wherein the inlet cover further comprises a plurality of openings forming a grid pattern in the inlet cover, wherein each of the plurality of openings has the same cross-sectional area.

12. The diesel exhaust fluid decomposition assembly of claim 11, wherein the inlet cover further comprises a non-circular opening having a cross-sectional area greater than one of the plurality of openings.

13. The diesel exhaust fluid decomposition assembly of claim 2, wherein the inlet channel has a converging cross-sectional profile, such that a fluid accelerates as a result of passing through the inlet channel.

14. The diesel exhaust fluid decomposition assembly of claim 13, wherein the outlet channel has a converging cross-sectional profile, such that a fluid accelerates as a result of passing through the outlet channel.

15. The diesel exhaust fluid decomposition assembly of claim 14, wherein at least one of a first end of the inlet cover or a first end of the outlet cover forms a fluid director for changing the direction of fluid flow of a fluid between the inlet channel and the outlet channel.

16. A diesel exhaust fluid decomposition assembly comprising:
    an outlet cover;
    an inlet cover coupled to the outlet cover; and
    a support plate disposed between the outlet cover and the inlet cover, the support plate forming an outlet channel with the outlet cover and an inlet channel with the inlet cover, wherein the inlet channel is fluidly coupled to the outlet channel, and wherein the inlet channel is adjacent to the outlet channel,
    wherein the outlet cover further comprises a plurality of openings forming a grid pattern extending from a first end of the outlet cover to a second end of the outlet cover, and wherein a cross-sectional area of each of the plurality of openings is selected according to a proximity in the grid pattern to the first end.

17. A diesel exhaust fluid decomposition assembly comprising:
    an outlet cover;
    an inlet cover coupled to the outlet cover; and
    a support plate disposed between the outlet cover and the inlet cover, the support plate forming an outlet channel with the outlet cover and an inlet channel with the inlet cover, wherein the inlet channel is fluidly coupled to the outlet channel, and wherein the inlet channel is adjacent to the outlet channel, wherein the outlet cover, the inlet cover, and the support plate are axially aligned, and wherein the outlet cover further comprises a plurality of openings forming a grid pattern extending from a first end of the outlet cover to a second end of the outlet cover, and wherein a cross-sectional area of each of the plurality of openings is selected according to a proximity in the grid pattern to the first end.

18. A diesel exhaust fluid decomposition assembly comprising:
    an outlet cover;
    an inlet cover coupled to the outlet cover; and
    a support plate disposed between the outlet cover and the inlet cover, the support plate forming an outlet channel with the outlet cover and an inlet channel with the inlet cover, wherein the inlet channel is fluidly coupled to the outlet channel, and wherein the inlet channel is adjacent to the outlet channel, wherein the outlet cover, the inlet cover, and the support plate are axially aligned, wherein the support plate is formed of at least two coupled non-planar sections, each of the at least two non-planar sections having a first surface that forms part of the inlet channel and an opposing second surface that forms part of the outlet channel, and wherein the at least two coupled non-planar sections are positioned to form a first region in the outlet channel comprising a converging cross-sectional profile, and a second region in the outlet channel comprising a diverging cross-sectional profile.

19. A diesel exhaust fluid decomposition assembly comprising:
an outlet cover;
an inlet cover coupled to the outlet cover; and
a support plate disposed between the outlet cover and the inlet cover, the support plate forming an outlet channel with the outlet cover and an inlet channel with the inlet cover, wherein the inlet channel is fluidly coupled to the outlet channel, and wherein the inlet channel is adjacent to the outlet channel,
wherein the support plate is formed of at least two coupled non-planar sections, each of the at least two non-planar sections having a first surface that forms part of the inlet channel and an opposing second surface that forms part of the outlet channel,
wherein the at least two coupled non-planar sections are positioned to form a first region in the outlet channel comprising a converging cross-sectional profile, and a second region in the outlet channel comprising a diverging cross-sectional profile.

20. An exhaust aftertreatment system comprising:
a housing having an exhaust inlet and an exhaust outlet, wherein the housing is configured to enclose a diesel particulate filter (DPF) and at least one selective catalytic reduction (SCR) catalyst, and to direct a flow of exhaust gas through the DPF and the SCR, wherein the DPF is fluidly coupled with the exhaust inlet and configured to direct the flow of exhaust gas in a first direction;
a diesel exhaust fluid (DEF) decomposition chamber removably attached to the housing and in fluid communication with the DPF, the decomposition chamber disposed between the DPF and the SCR, the decomposition chamber comprising;
an inlet cover coupled to an outlet cover; and
a support plate disposed between the outlet cover and the inlet cover, the support plate forming an outlet channel with the outlet cover and an inlet channel with the inlet cover, wherein the inlet channel is fluidly coupled to the outlet channel, and wherein the inlet channel is adjacent to the outlet channel,
wherein the support plate is formed of at least two coupled non-planar sections, each of the at least two non-planar sections having a first surface that forms part of the inlet channel and an opposing second surface that forms part of the outlet channel.

21. An exhaust aftertreatment system comprising:
a housing having an exhaust inlet and an exhaust outlet, wherein the housing is configured to enclose a diesel particulate filter (DPF) and at least one selective catalytic reduction (SCR) catalyst, and to direct a flow of exhaust gas through the DPF and the SCR, wherein the DPF is fluidly coupled with the exhaust inlet and configured to direct the flow of exhaust gas in a first direction;
a diesel exhaust fluid (DEF) decomposition chamber removably attached to the housing and in fluid communication with the DPF, the decomposition chamber disposed between the DPF and the SCR, the decomposition chamber comprising;
an inlet cover coupled to an outlet cover; and
a support plate disposed between the outlet cover and the inlet cover, the support plate forming an outlet channel with the outlet cover and an inlet channel with the inlet cover, wherein the inlet channel is fluidly coupled to the outlet channel, and wherein the inlet channel is adjacent to the outlet channel, wherein the outlet cover, the inlet cover, and the support plate are axially aligned, and wherein the support plate is formed of at least two coupled non-planar sections, each of the at least two non-planar sections having a first surface that forms part of the inlet channel and an opposing second surface that forms part of the outlet channel.

22. The exhaust aftertreatment system of claim 21, further comprising a plurality of SCR catalysts each comprising an inlet surface, wherein the DEF decomposition chamber is configured to provide a uniform distribution of DEF and exhaust gas at the inlet surfaces of the plurality of SCR catalysts.

23. The exhaust aftertreatment system of claim 21, wherein the inlet channel has a converging cross-sectional profile, such that a fluid accelerates as a result of passing through the inlet channel.

24. The exhaust aftertreatment system of claim 23, wherein the outlet channel has a converging cross-sectional profile, such that a fluid accelerates as a result of passing through the outlet channel.

* * * * *